(12) United States Patent
Sullivan et al.

(10) Patent No.: US 8,542,236 B2
(45) Date of Patent: Sep. 24, 2013

(54) GENERATING ANIMATION LIBRARIES

(75) Inventors: Steve Sullivan, San Francisco, CA (US); Francesco G. Callari, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 508 days.

(21) Appl. No.: 11/623,707

(22) Filed: Jan. 16, 2007

(65) Prior Publication Data

US 2008/0170077 A1 Jul. 17, 2008

(51) Int. Cl.
*G06T 13/00* (2011.01)

(52) U.S. Cl.
USPC .............................. 345/473; 345/474; 345/957

(58) Field of Classification Search
USPC .......................................... 345/473, 957, 474
See application file for complete search history.

(56) References Cited

U.S. PATENT DOCUMENTS

| | | | |
|---|---|---|---|
| 5,790,124 A | 8/1998 | Fischer et al. | |
| 5,831,260 A | 11/1998 | Hansen | |
| 5,932,417 A | 8/1999 | Birnbaumer et al. | |
| 6,072,496 A | 6/2000 | Guenter et al. | |
| 6,115,052 A | 9/2000 | Freeman et al. | |
| 6,166,811 A | 12/2000 | Long et al. | |
| 6,208,348 B1 | 3/2001 | Kaye | |
| 6,324,296 B1 | 11/2001 | McSheery et al. | |
| 6,353,422 B1 | 3/2002 | Perlman | |
| 6,438,255 B1 | 8/2002 | Lesniak | |
| 6,515,659 B1 | 2/2003 | Kaye et al. | |
| 6,522,332 B1 | 2/2003 | Laneiault et al. | |
| 6,606,095 B1 | 8/2003 | Lengyel et al. | |
| 6,614,407 B2 | 9/2003 | Perlman | |
| 6,614,428 B1 | 9/2003 | Lengyel | |
| 6,633,294 B1 | 10/2003 | Rosenthal et al. | |
| 6,686,926 B1 | 2/2004 | Kaye | |
| 6,919,892 B1 | 7/2005 | Cheiky et al. | |
| 6,977,630 B1 | 12/2005 | Donath et al. | |
| 7,027,054 B1 | 4/2006 | Cheiky et al. | |
| 7,035,436 B2 | 4/2006 | Nakamura et al. | |
| 7,098,920 B2 | 8/2006 | Marschner et al. | |
| 7,102,633 B2 | 9/2006 | Kaye et al. | |
| 7,116,323 B2 | 10/2006 | Kaye et al. | |
| 7,116,324 B2 | 10/2006 | Kaye et al. | |
| 7,129,949 B2 | 10/2006 | Marschner et al. | |
| 7,164,718 B2 | 1/2007 | Maziere et al. | |

(Continued)

FOREIGN PATENT DOCUMENTS

| | | |
|---|---|---|
| EP | 1946243 | 7/2008 |
| JP | 09-084691 | 9/1998 |
| WO | WO2004/041379 | 5/2004 |

OTHER PUBLICATIONS

Herda et al. "Skeleton-based motion capture for robust reconstruction of human motion", Computer Animation 2000, Proceedings, pp. 77-83, May 2000.

(Continued)

*Primary Examiner* — Maurice L McDowell, Jr.
(74) *Attorney, Agent, or Firm* — Kilpatrick Townsend & Stockton LLP (57) ABSTRACT

A computer-implemented method includes transferring motion information from one or more motion meshes to an animation mesh. The motion mesh represents the motion of surface features of an object. A shape mesh provides a portion of the shape of the object to the animation mesh.

70 Claims, 7 Drawing Sheets

(56) References Cited

U.S. PATENT DOCUMENTS

| | | | |
|---|---|---|---|
| 7,184,047 B1 | 2/2007 | Crampton | |
| 7,212,656 B2 | 5/2007 | Liu et al. | |
| 7,292,261 B1 | 11/2007 | Teo | |
| 7,433,807 B2 | 10/2008 | Marschner et al. | |
| 7,450,126 B2 | 11/2008 | Marschner et al. | |
| 7,535,472 B2 | 5/2009 | Kim et al. | |
| 7,554,549 B2 | 6/2009 | Sagar et al. | |
| 7,605,861 B2 | 10/2009 | LaSalle et al. | |
| 7,848,564 B2 | 12/2010 | Sullivan et al. | |
| 8,019,137 B2 | 9/2011 | Sullivan et al. | |
| 8,130,225 B2 | 3/2012 | Sullivan et al. | |
| 8,144,153 B1 | 3/2012 | Sullivan et al. | |
| 2001/0024512 A1 | 9/2001 | Yoronka et al. | |
| 2001/0033675 A1 | 10/2001 | Maurer et al. | |
| 2002/0041285 A1* | 4/2002 | Hunter et al. | 345/474 |
| 2002/0060649 A1 | 5/2002 | Perlman | |
| 2004/0063481 A1 | 4/2004 | Wang | |
| 2004/0119716 A1 | 6/2004 | Park et al. | |
| 2004/0155962 A1 | 8/2004 | Marks | |
| 2004/0161132 A1 | 8/2004 | Cohen et al. | |
| 2004/0179008 A1 | 9/2004 | Gordon et al. | |
| 2005/0078124 A1* | 4/2005 | Liu et al. | 345/629 |
| 2005/0099414 A1 | 5/2005 | Kaye et al. | |
| 2005/0104878 A1 | 5/2005 | Kaye et al. | |
| 2005/0104879 A1 | 5/2005 | Kaye et al. | |
| 2005/0146521 A1 | 7/2005 | Kaye et al. | |
| 2005/0231505 A1 | 10/2005 | Kaye et al. | |
| 2006/0055699 A1 | 3/2006 | Perlman et al. | |
| 2006/0055706 A1 | 3/2006 | Perlman et al. | |
| 2006/0067573 A1 | 3/2006 | Parr et al. | |
| 2006/0126928 A1 | 6/2006 | Edwards et al. | |
| 2006/0157640 A1 | 7/2006 | Perlman et al. | |
| 2006/0192785 A1 | 8/2006 | Marschner et al. | |
| 2006/0192854 A1 | 8/2006 | Perlman et al. | |
| 2006/0228101 A1 | 10/2006 | Sullivan et al. | |
| 2007/0052711 A1 | 3/2007 | Gordon et al. | |
| 2007/0091178 A1 | 4/2007 | Cotter et al. | |
| 2007/0133841 A1 | 6/2007 | Zhang et al. | |
| 2008/0100622 A1 | 5/2008 | Gordon | |
| 2008/0170078 A1 | 7/2008 | Sullivan et al. | |
| 2008/0170777 A1 | 7/2008 | Sullivan et al. | |
| 2008/0180448 A1 | 7/2008 | Anguelov et al. | |
| 2009/0209343 A1 | 8/2009 | Foxlin et al. | |
| 2010/0002934 A1 | 1/2010 | Sullivan et al. | |
| 2010/0164862 A1 | 7/2010 | Sullivan et al. | |

OTHER PUBLICATIONS

Lin et al. "Extracting 3D facial animation parameters from multiview video clips", IEEE Computer Graphics and Applications, vol. 22, No. 6, pp. 72-80, Nov. 2002.

Heap et al. "Towards 3D hand tracking using a deformable model", IEEE Computer Society, pp. 140-145, Oct. 1996.

Grung et al. "Missing values in principal component analysis", Chemometrics and Intelligent Laboratory Systems, vol. 42, No. 1-2, pp. 125-139, Aug. 1998.

Debevec, et al. "Acquiring the Reflectance Field of a Human Face", SIGGRAPH 2000 Conference Proceedings, pp. 1-12, 2000.

Examination Report from New Zealand Patent Office for Application No. 581496,dated Dec. 2, 2009, 2 pages.

Examination Report from United Kingdom Office for Application No. PCT/US2006/009787, dated Aug. 3, 2009, 2 pages.

Examination Report from New Zealand Patent Office for Application No. 561570, dated Dec. 18, 2009, 1 page.

Markoff, "Camera System Creates Sophisticated 3-D Effects" [online], New York Times, Jul. 31, 2006, [retrieved on Jul. 31, 2006]. Retrieved from the Internet: <URL: www.nytimes.com/2006/0731/technology/31motion.html >, 4 pg.

International Search Report and Written Opinion for PCT Application No. PCT/US2006/009787, dated Oct. 29, 2007, 12 pages.

International Preliminary Report on Patentability for PCT Application No. PCT/US2006/009787, dated Nov. 13, 2007, 9 pages.

Chang et al., "Automatic 3D Facial Expression in Analysis in Videos," Proc. IEEE Int'l Workshop Analysis and Modeling of Faces and Gestures (AMFG '05), vol. 3723, pp. 293-307, 2005.

Deng et al., "Animating blendshape faces by cross-mapping motion capture data," In Proceedings of the 2006 Symposium on Interactive 3D Graphics and Games (Redwood City, California, Mar. 14-17, 2006). I3D '06. ACM, New York, NY, 43-48.

Horprasert et al., "Real-time 3D Motion Capture," Second workshop on Perceptual Interfaces, San Francisco, Nov. 1998, 4 pages.

Furukawa et al., "Dense 3D Motion Capture from Synchronized Video Streams," [online], [retrieved on Aug. 26, 2009]. Retrieved from the Internet <URL: http://www.cs.washington.edu/homes/furukawa/papers/cvpr08b.pdf>, 8 pages.

Wren et al, "Dynamic Models of Human Motion," [online], 1998, [retrieved on Aug. 26, 2009]. Retrieved from the Intern et <URL: http://www.drwren.com/chris/dyna/TR-415.pdf>, 6 pages.

Examination Report from European Patent Office for Application No. GB0718003.7, dated Aug. 3, 2009, 2 pages.

Examination Report from New Zealand Patent Office for Application No. 561570, dated Jul. 7, 2009, 2 pages.

Stopford, Office Action issued in AU application No. 2009240847 mailed Nov. 23, 2011, 4 pages.

Majkowska, A. et al., "Automatic splicing for hand and body animations." 2006. In Proceedings if the 2006 ACM SIGGRAPH/Eurographics symposium on Computer animation (SCA '06). Eurographics Associate, Aire-la-Ville, Switzerland, Switzerland, pp. 309-316 and 369.

Anguelov, Dragomir et al., "SCAPE: Shape Completion and Animation of People." 2005, ACM Inc., pp. 408-416.

Bespalov, Dmitriy et al., "Local Feature Extraction and Matching Partial Objects." Drexel University, Aug. 6, 2006, pp. 1-30.

Heseltine, Thomas et al., "Three-Dimensional Face Recognition an Eigensurface Approach." 2004 International Conference on Image Processing (ICIP), pp. 1421-1424.

Preteux, Francoise et al., "Model-Based Head Tracking and 3D Pose Estimation." Sep. 24, 1998, Institut National des Telecommunications, 15 pages.

Examination Report from New Zealand Patent Office for Application No. 582356, dated Jan. 7, 2010, 2 pages.

Search Report from United Kingdom Intellectual Property Office for application No. GB0922650.7, dated Apr. 20, 2010, 2 pages.

Agarwala, Aseem, "Keyframe-Based Tracking for Rotoscoping and Animation," ACM SIGGRAPH '04 conference proceedings, 2004, pp. 1-8.

Buenaposada, Jose M., "Performance driven facial animation using illumination independent appearance-based tracking," In Proceedings of ICPR, Hong Kong, Aug. 2006, 4 pages.

Gleicher, Michael, "Animation From Observation: Motion Capture and Motion Editing," Computer Graphics 33(4), 1999, pp. 1-5.

Bascle, Blake, "Separability of pose and expression in facial tracking and animation," Jan. 1998, IEEE Computer Society, Proceedings of the Sixth International Conference on Computer Vision, pp. 323-328.

Parke, F., "Computer Generated Animation of Faces," Aug. 1972, SIGGRAPH 1972, pp. 451-457.

Curio, Cristóbal et al., "Semantic 3D Motion Retargeting for Facial Animation." ACM Jul. 28-29, 2006, pp. 77-84, 176.

Park, S. et al., "Capturing and Animating Skin Deformation in Human Motion." ACM 2006, pp. 881-889.

Zhang, Qingshan, et al., "Geometry-Driven Photorealistic Facial Expression Synthesis," IEEE Transactions on Visualization and Computer Graphics, vol. 12, No. 1, Jan./Feb. 2006, pp. 48-60.

Heck, Rachel, et al., "Splicing Upper-Body Actions with Locomotion." Eurographics 2006, vol. 25 (2006), No. 3, pp. 459-466.

* cited by examiner

GENERATING ANIMATION LIBRARIES

TECHNICAL FIELD

This document relates to generating libraries for storing animation information.

BACKGROUND

Computer-based animation techniques often involve capturing a series of images of an actor (or other object) with multiple cameras that each have a different viewing perspective. The cameras are synchronized such that for one instant in time, each camera captures an image. These images are then combined to generate a three-dimensional (3D) graphical representation of the actor. By repetitively capturing images over a period of time, a series of 3D representations may be produced that illustrate the actor's motion (e.g., body movements, speech, etc.).

To produce an animation that tracks the actor's motion, a digital mesh may be generated from each 3D representation such that each mesh represents the position of the actor at the time of image capture. Together, the digital meshes represent the movement of the actor over the image capture time period. For example, the actor's face may be represented in a series of digital meshes that track facial expressions of the actor. Markers (e.g., make-up dots) that contrast with the actor's skin tone may be applied to the actor's face to highlight facial features and provide points to align vertices of the meshes.

Once generated, the digital meshes may be rendered as a computer-generated object (e.g., a character's body) to produce an animated character that includes, for example, the facial expressions of the actor. However, to provide sufficient detail such that the actor's face is recognizable, each mesh includes a significant number of vertices that correspond to many applied markers captured under optimum lighting conditions. Along with needing considerable processing time and capacity for storing the digital meshes, the actor must endure the application of many facial markers for each image capture session.

SUMMARY

The invention relates to generating animation information from captured data. For example, libraries may be produced for storing animation information. One mesh may be generated that represents the motion of an object such as an actor's face from captured data. A second mesh may also be generated from the captured data to represent the shape of the actor's face. Both of these meshes may be used to animate a relatively high resolution mesh that represents the object. Furthermore, motion information used to animate this mesh may be processed and stored for retrieval at a later time for other animation efforts.

In one aspect, a computer-implemented method includes transferring motion information from a motion mesh to an animation mesh. The motion mesh represents the motion of surface features of an object. A shape mesh provides a portion of the shape of the object to the animation mesh.

Implementations may include any or all of the following features. The motion mesh may be generated from a series of images of the object captured by at least one device. The motion, information may include one or more positions of a vertex, the position of curved surface structure, a surface structure patch or other type of surface structure included in the motion mesh. The motion information may be transferred to a vertex, curved surface structure, a surface structure patch or other type of surface structure included in the animation mesh. A position of a vertex included in the animation mesh may represent or be influenced by the position of one or more vertices included in the motion mesh (and by the shape of the shape mesh). The position of a vertex included in the animation mesh may be independent of the influence of one or more vertices included in the motion mesh. The position, of a vertex included in the animation mesh may represent an interpolated position of two or more motion mesh vertices. The position of a vertex included in the animation mesh may change based upon the position of a vertex included in another motion mesh.

The method may also include decomposing a portion or all of the motion information. For example, the motion information may be decomposed into principle components. The decomposed motion information (e.g., principle components) may be stored for later retrieval and use. The resolution of the animation mesh may be higher than the resolution of the motion mesh. The motion information may also be stored in a data file. The animation mesh may include vertices that are substantially uniformly distributed or substantially distributed across a portion of the mesh. The surface features may be artificial points, natural points, curves, or the like. Transferring the motion information may include interpolating vertices of the motion mesh in a linear or non-linear manner. The object may be a deformable object such as an actor's face.

In another aspect, a system includes a motion transferor to transfer motion information from a motion mesh to an animation mesh. The motion mesh represents the motion of surface features of an object. A shape mesh provides a portion of the shape of the object to the animation mesh.

In still another aspect, a computer program product tangibly embodied in an information carrier and comprises instructions that when executed by a processor perform a method that includes transferring motion information from a motion mesh to an animation mesh. The motion mesh represents the motion of surface features of an object. A shape mesh provides a portion of the shape of the object to the animation mesh.

In still another aspect, a motion capture system includes one or more devices that capture a series of images of an object. The motion capture system also includes a computer system that executes one or more processes to generate one or more motion meshes that represent the motion of surface features of the object. The executed processes also transfer the motion information of the motion mesh to an animation mesh for animation. A shape mesh provides a portion of the shape of the object to the animation mesh.

The details of one or more embodiments of the invention are set forth in the accompanying drawings and the description below. Other features, objects, and advantages of the invention will be apparent from the description and drawings, and from the claims.

DESCRIPTION OF DRAWINGS

Like, reference symbols in the various drawings indicate like elements.

DETAILED DESCRIPTION

Figure 1:
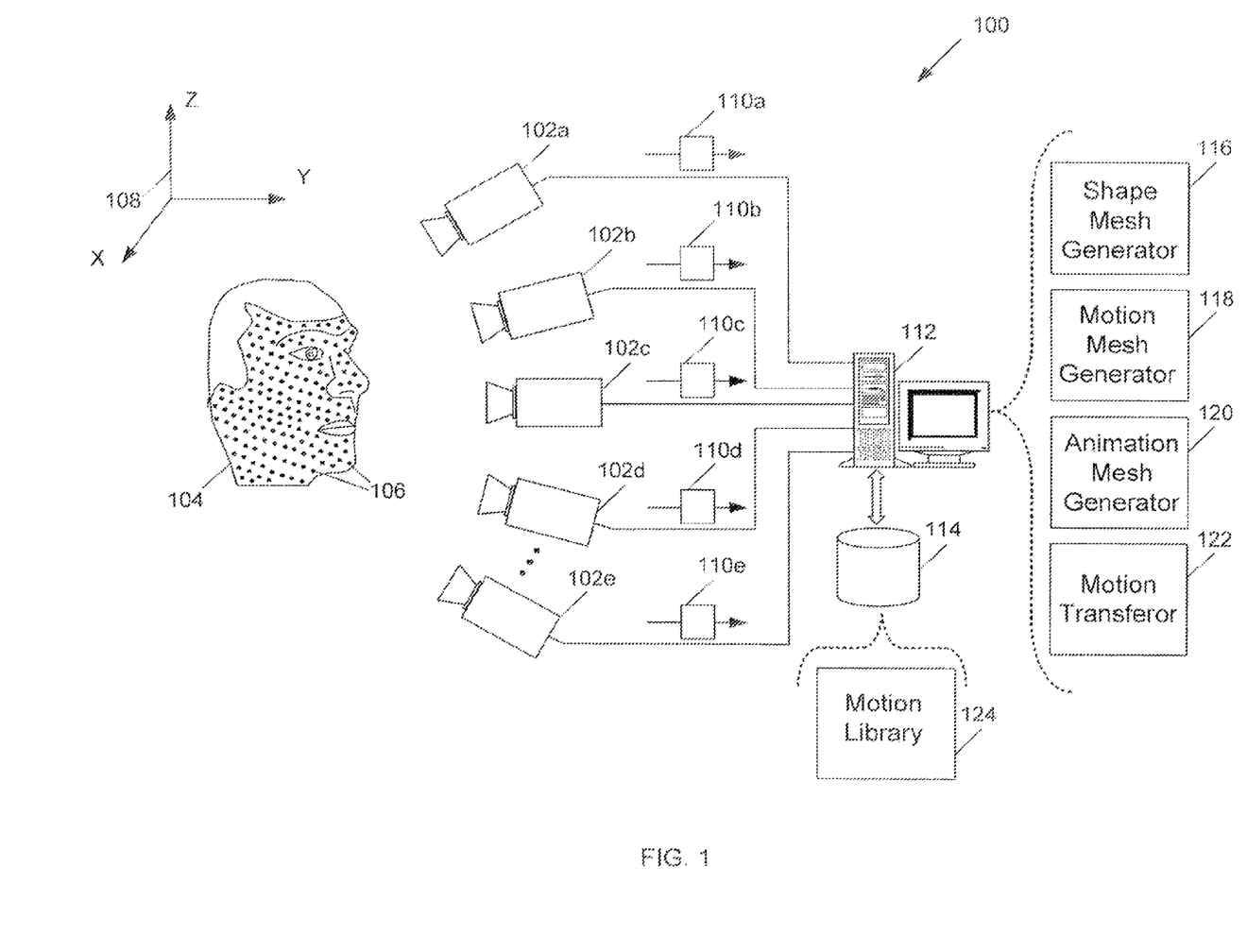
FIG. 1 is a diagram of an exemplary motion capture system.

Referring to FIG. 1, a motion capture system 100 includes a group of cameras 102a-e that are capable of capturing images of an actor's face 104 or other type of deformable object. To highlight facial features, a series of markers 106 (e.g., makeup dots) are applied to the actor's face 104. Dependent upon lighting conditions and the facial expressions to be captured, the markers 106 may be distributed in various patterns. For example, the markers may be uniformly distributed across the face 104 or some of the markers may be concentrated in particular areas (e.g., corners of the mouth) that tend to deform with detailed shapes for many facial expressions. Along with artificial highlight points (e.g., markers 106), natural points of the actor's face 104 may be used to represent facial surface features. For example, the texture of the actor's face may provide distinct features. Contours, curves, or other similar types of shapes in an actor's face may also represent facial features. For example, the contour of a lip, the curve of an eyebrow or other portions of an actor's face may represent useful features.

The cameras 102a-e are temporally synchronized such that each captures an image at approximately the same time instant. Additionally, the cameras 102a-e are spatially positioned (in known locations) such that each camera provides a different aspect view of the actor's face 104. In this illustration, the cameras are arranged along one axis (e.g., the "Z" axis of a coordinate system 108), however, the cameras could also be distributed along another axis (e.g., the "X" axis or the "Y" axis) or arranged in any other position in three dimensional space that may be represented by the coordinate system 108. Furthermore, while cameras 102a-e typically capture optical images, in some arrangements the cameras may be capable of capturing infrared images or images in other portions of the electromagnetic spectrum. Thereby, along with optical cameras, infrared cameras, other types of image capture devices may be implemented in the motion capture system 100. Cameras designed for collecting particular types of information may also be implemented such as cameras designed for capturing depth information, contrast information, or the like. Image capturing devices may also be combined to provide information such as depth information. For example, two or more cameras may be bundled together to form an image collection device to capture depth information.

As illustrated in the figure, each camera 102a-e is capable of respectively capturing and providing an image 110a-e to a computer system 112 (or other type of computing device) for cataloging the captured facial expressions and applying facial expressions to animated objects. Various image formats (e.g., jpeg, etc.) and protocols may be used and complied with to transfer the images to the computer system 112. Additionally, the computer system 112 may convert the images into one or more other formats. Along with components (e.g., interface cards, etc.) for receiving the images and communicating with the cameras 102a-e, the computer system 112 also include memory (not shown) and one or more processors (also not shown) to execute processing operations. A storage device 114 (e.g., a hard drive, a CD-ROM, a Redundant Array of Independent Disks (RAID) drive, etc.) is in communication with the computer system 112 and is capable of storing the captured images along with generated meshes, rendered animation, and other types of information (e.g., motion information) and processed data.

To process the received camera images 110a-e (along with exchanging associated commands and data), a shape mesh generator 116 is executed by the computer system 112. The shape mesh generator 116 combines the cameras images 110a-e into a three-dimensional (3D) shape mesh (for that capture time instance) by using stereo reconstruction or other similar methodology. The shape mesh has a relatively high resolution and provides the 3D shape of the captured object (e.g., actor's face 104). For a series of time instances, the shape mesh generator 116 can produce corresponding shape meshes that match the movement of the actor's face 104.

A motion mesh generator 118 is also executed by the computer system 112 to produce relatively lower resolution meshes that represent the position of the markers as provided by images 100a-e. As described in detail below, these meshes (referred to as motion, meshes) track the movement of the markers 106 as the actor performs. For example, the actor may produce a series of facial expressions that are captured by the cameras 102a-e over a series of sequential images. The actor may also provide facial expressions by delivering dialogue (e.g., reading from a script) or performing other actions associated with his character role. For each facial expression and while transitioning between expressions, the markers 106 may change position. By capturing this motion information, the facial expressions may be used to animate a computer-generated character. However, the resolution of the motion meshes is dependent upon the number of markers applied to the actor's face and the image capture conditions (e.g., lighting), for example. Similarly, shape meshes may be produced by the shape mesh generator 116 that represent the shape of the facial expressions over the actor's performance.

To produce an animated character, an animation mesh generator 120 generates a mesh (referred to as an animation mesh) that represents the three-dimensional shape of the actor's face (or a character's face) and is suitable for animation. Motion information is transferred to the animation mesh from the motion meshes (generated by the motion mesh generator 118) and the shape meshes (generated by the shape mesh generator 116). This animation mesh may be produced from one or more types of information such as the camera images 110a-e. User input may also be used to produce the animation mesh. For example, the animation mesh may be produced by an artist independent of the animation mesh generator 120, or in concert with the animation mesh generator.

In this implementation, to animate the character, a motion transferor 122 incorporates motion from the motion meshes and the shape meshes into the animation mesh. Thereby, motion information is provided to a high resolution mesh (i.e., the animation mesh) by a relatively lower resolution mesh (i.e., the motion mesh). Additionally, shape information from the shape mesh may be used to constrain the motion of the animation mesh. Thus, a high resolution animation mesh may be animated from less motion information (compared to applying additional markers to the actors face to produce a series of higher resolution motion meshes). As such, a session may be held with an actor in which camera images are captured under fairly controlled conditions. From this training session data, the motion capture system 100 may become familiar with the general movements and facial expressions of the actor (via the generated motion meshes and shape meshes).

By storing the animation mesh with the incorporated motion (constrained by the shape information) in the storage device 114, the data may be retrieved for use at a later time. For example, the stored mesh may be retrieved to incorporate one or more of the actor's facial expressions into an animation. The stored motion information may also be processed (e.g., combined with other motion information, applied with weighting factors, etc.) to produce new facial expressions that may be applied to an animated character (along with being stored in the storage device 114).

The motion transferor 122 may also be capable of processing the animation meshes and motion information for efficient storage and reuse. For example, as described below, the motion transferor 122 may decompose the motion information. Decomposition techniques such as Principle Component Analysis (PCA) may be implemented. Generally, PCA is an analysis methodology that identifies patterns in data and produces principle components that highlight data similarities and differences. By identifying the patterns, data may be compressed (e.g., dimensionality reduced) without much information loss. Along with conserving storage space, the principle components may be retrieved to animate one or more animation meshes. For example, by combining principle components and/or applying weighting factors, the stored principle components may be used to generate motion information that represent other facial expressions. Thus, a series of actor facial expressions may be captured by the cameras 102*a-e* to form a motion library 124 that is stored in the storage device 114. The motion library 124 may use one or more types of data storage methodologies and structures to provide a storage system that conserves capacity while providing reliable accessibility.

To render the animation meshes (e.g., using motion information from the motion library 124) into animations, one or more processes may also executed by the computer system 112 or another computing device. By using the animation meshes and the motion information produced by the motion transferor 122, the facial expressions and likeness of the actor may be incorporated into an animated character or other type of graphical object. Similar to the animation meshes, once rendered, the animated character or graphical object may be stored in the storage device 124 for later retrieval.

In this exemplary motion capture system 100, the shape mesh generator 116, the motion mesh generator 118, the animation mesh generator 120 and the motion transferor 122 are separate entities (e.g., applications, processes, routines, etc.) that may be independently executed, however, in some implementations, the functionality of two or more of these entities may be combined and executed together.

Figure 2:
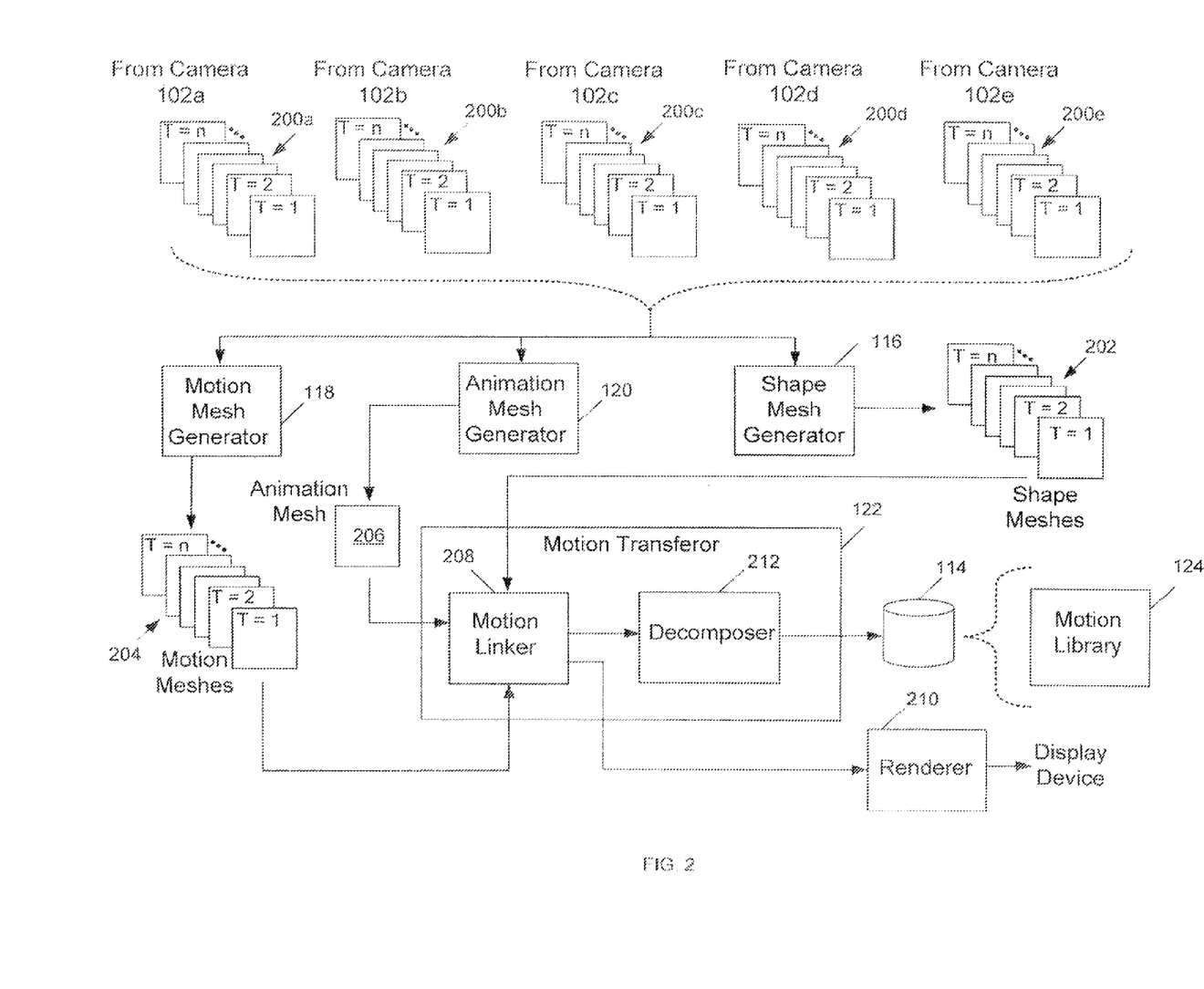
FIG. 2 is a diagram that illustrates mesh production by the motion capture system.
Figure 3A:
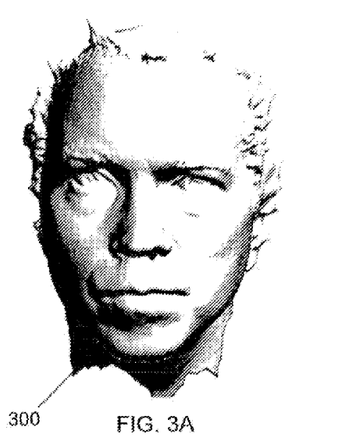
FIGS. 3A-D includes a shape mesh, an image, a motion mesh overlaying the image and the motion mesh.

Referring to FIG. 2, a series of images 200*a-e* respectively captured by cameras 102*a-e* are illustrated. By temporally synchronizing the cameras 102*a-e*, corresponding images may be captured during the same time instance. For example, each of the images labeled "T=1" may have been captured at the same time. The images 200*a-e* are provided to the computer system 112 for processing by the shape mesh generator 116, the motion mesh generator 118, the animation mesh generator 120 and the motion transferor 122. For processing, the content of the images captured at the same time instance may be combined. For example, the shape mesh generator 116 may use stereo reconstruction (or other similar methodology) to construct a 3D shape mesh 202 for each time instance from the corresponding captured images. Generally each shape mesh has a relatively high resolution and provides a detailed representation of the shape of the captured object (e.g., the actor's face 104). As shown in FIG. 3A, an exemplary shape mesh 300 illustrates the shape (e.g., an actor's facial expression) produced from images (e.g., images 110*a-e*) capture at the same time instant. While large in number, the vertices of the shape mesh 300 may not be distinguishable (compared to the markers) and may not be quantified by a coordinate system. As such, the motion of individual vertices may not be tracked from one shape mesh (e.g., T=1 shape mesh) to the next sequential shape meshes (e.g., T=2 shape mesh, . . . , T=n shape mesh).

Figure 3B:
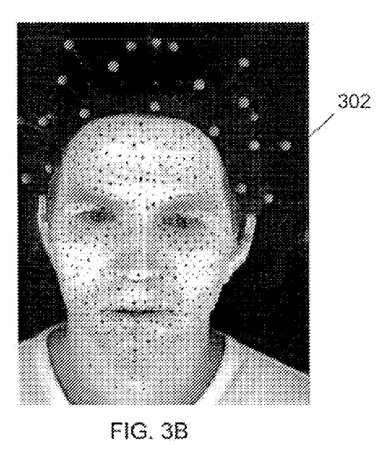

Returning to FIG. 2, along with producing shape meshes, motion meshes may be produced from the content of the images 200*a-e* to track marker motion. As shown in FIG. 3B, a high resolution image 302 illustrates the content (e.g., an actor's facial expression) of one high resolution image (e.g., 200*a*) at one time instance, (e.g., T=1). Along with showing the markers (e.g., makeup dots) applied on the actor's face (that contrast with the actor's skin tone), the high-resolution image 302 also shows the markers (e.g., white balls) applied to the top of the actor's head that contrast with the color of the actor's hair.

Each captured high resolution image may contain similar content for different perspectives and for different time instants. Sequentially viewing these high resolution images, the shape of the actor's face may change as he changed his facial expression over the image capture period. Correspondingly, the markers applied to the actor's face may change position with the changing facial expressions. By determining the position of each marker in space (e.g., according to coordinate system 108), a three dimensional motion mesh 204 may be produced that represents the marker positions in 3D space. To track marker motion over time, additional motion meshes 204 are produced (for each capture time instance) from the content the corresponding high resolution images. As such, marker position changes may be tracked from one motion mesh to the next. The positions or position changes of the markers (for each capture time instance) may also be entered and stored in a data file or other similar structure. Other types of data from the images 200*a-e* may be used for producing motion meshes 204. For example, the content of the shape meshes 202 may be used for motion mesh production. By producing motion meshes for these time instances or a data file that stores marker positions, a quantitative measure of the marker position changes is provided as the actor changes his facial expression.

Figure 3C:
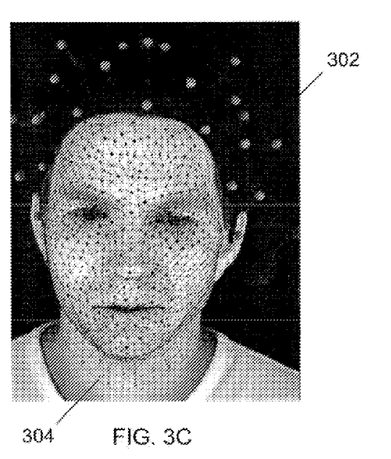
Figure 3D:
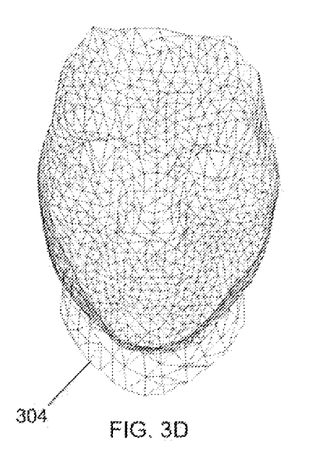

In this implementation, to generate a motion mesh from the images 200*a-e*, the motion mesh generator 118 determines the position of each marker in three dimensional space and the positions of the cameras 102*a-e*. Each marker position is assigned to a vertex, which in combination form facets of a motion mesh. In some arrangements, the position determination is provided as described in U.S. patent application Ser. No. 11/384,211 (published as United States Patent Application Publication 2006/0228101), herein incorporated by reference. Referring to FIG. 3C, a motion mesh 304 is presented overlaying the image 302 (shown, in FIG. 3B). The vertices of the motion mesh 304 are assigned the respective positions of the markers applied to the actor's face and interconnect to adjacent vertices to form triangular facets. Referring to FIG. 3D, the motion mesh 304 is shown absent the high resolution image 302. As is apparent, the resolution of the motion mesh 304 is relatively low and the actor's face is not generally recognizable. However, by correlating the vertices with the positions of the markers in subsequent high resolution images, the position of the vertices may be tracked over time and thereby allow motion tracking of the actor's facial expressions. Furthermore, by quantifying the positions of the vertices over time, the associated motion information may be used to transfer the actor's facial expressions to an animated character or other type of computer-generated object.

As mentioned, while the vertices of the motion mesh 304 allow tracking of the motion of the actor's face, the relatively low resolution of the motion mesh does not provide a recognizable face. To improve resolution, some conventional methodologies increase the number of markers applied to the actor's face, thereby increasing the number of motion mesh vertices and mesh resolution. However, additional markers require more of the actor's time for application along with additional processing and storage space to generate and store the motion mesh. Furthermore, optimal lighting conditions may be needed to resolve the closely position markers. Thus, image capture may be always need to be confined to a controlled lighting environment such as a studio and not be applicable in low light environments or naturally lit environments (e.g., outside).

Rather than capture more marker information, a relatively high resolution animation mesh may be produced, and receive motion information transferred from the low resolution motion meshes 204. Furthermore, the high resolution shape information contained in the shape meshes 202 may be used to transfer motion from the lower resolution motion meshes 204. Thus the animation mesh is driven by motion information provided from the motion meshes 204 (as influenced by the shape meshes 202).

In this implementation of the motion capture system 100, an animation mesh 206 is produced by the animation mesh generator 120 from the content of one or more of the images 200a-e. However, the animation mesh 206 may be produced by other methodologies. For example, a graphic artist may generate the animation mesh 206 from one or more of the images 200a-e by applying a high resolution grid. Graphical software packages may also be used by the graphic artist or in conjuncture with the animation mesh generator 120 to generate the animation mesh 206.

To provide motion to the animation mesh 206, motion information associated with the motion meshes 204 is transferred to the animation mesh. Thereby, the animation mesh 206 provides a high resolution representation of the actor's face and incorporates the movement of the motion meshes 204. Additionally, the shape information provided by one or more of the shape meshes 202 may be used to influence the motion information provided by the motion meshes 204. For example, the shape information may constrain the application of the motion information to the animation mesh 206.

Figure 4A:
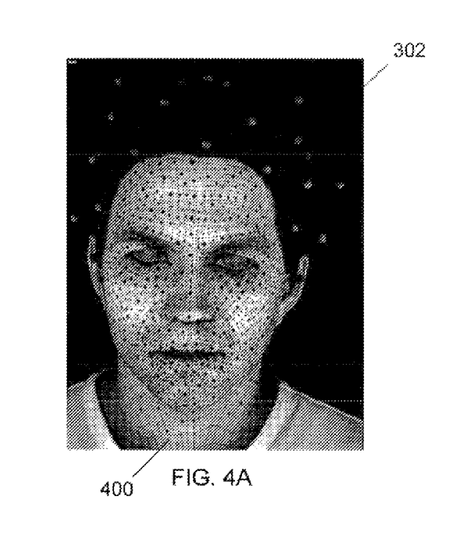
FIGS. 4A-C includes an animation mesh overlaying a captured image, the animation mesh and a rendering of the animation mesh.

Referring to FIG. 4A, an animation mesh 400 is shown overlaying the image 302 (also shown in FIG. 3B). As is apparent from the figure, the animation mesh 400 includes a grid that conforms to the shape of the actor's face depicted in the image 302 in some instances, a graphic artist may use visual interpolation to select grid vertices or to include additional grid vertices in the animation mesh 400. Additionally, the artist (or the animation mesh generator 120) may select more points in particular facial regions (e.g., the corner of the mouth) that may need finer resolution to properly represent a feature of the actor's face. Vertices may also be more uniformly distributed across facial regions (e.g., the forehead) where less detail is needed. Generally, more vertices are included in the animation mesh 400 compared to the motion mesh 304 and provide finer detail. For example, the curvature of the actor's nose is more pronounced in the animation mesh 400 compared to shape provided by the markers represented in the motion mesh 304 as shown in FIG. 3D.

Some vertices of the animation mesh 400 may have positions equivalent, to vertices included in the motion mesh 304, however, since the animation mesh has more vertices, some of the animation mesh vertices may not map to the same positions as the motion mesh vertices. Some of the animation mesh 400 vertices may similarly map to vertices of the shape mesh 300 (shown in FIG. 3A).

In some implementations, along with one or more of the images 200a-e, other graphical information may be used to generate the animation mesh 206. For example, one or more of the shape meshes 202, the motion meshes 204, or multiple meshes may overlay one of the images 200a-e. From these overlaid images, the artist (or the animation mesh generator 120) may select vertices to provide a detailed representation of the actor's face.

Figure 4B:
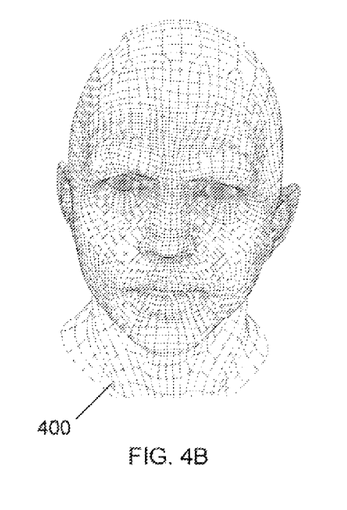

Referring to FIG. 4B, the animation mesh 400 is shown absent the image 302 in the background. The animation mesh 400 provides a more detailed representation of the actor's face compared to the motion mesh 304 while being somewhat similar in resolution to the shape mesh 300. The animation mesh 400 includes vertices such that features of the actor's eyes, mouth and ears are clearly represented. The motion information associated with motion meshes (along with the shape information of shape meshes) may be used to change the positions of the vertices included in the animation mesh 400 and thereby provide animation. Motion information may also be transferred to other types of surface structures that define the animation mesh 400. For example, curved structures, patches, and other surface structures may be moved independently or in combination with one or more vertices. The surface structures may also define particular portions of a face, for example, one or more curved surface structures may be used to represent a portion of a lip and one or more patch surface structures may represent a portion of a cheek, forehead, or other portion of an actor's face.

Figure 5:
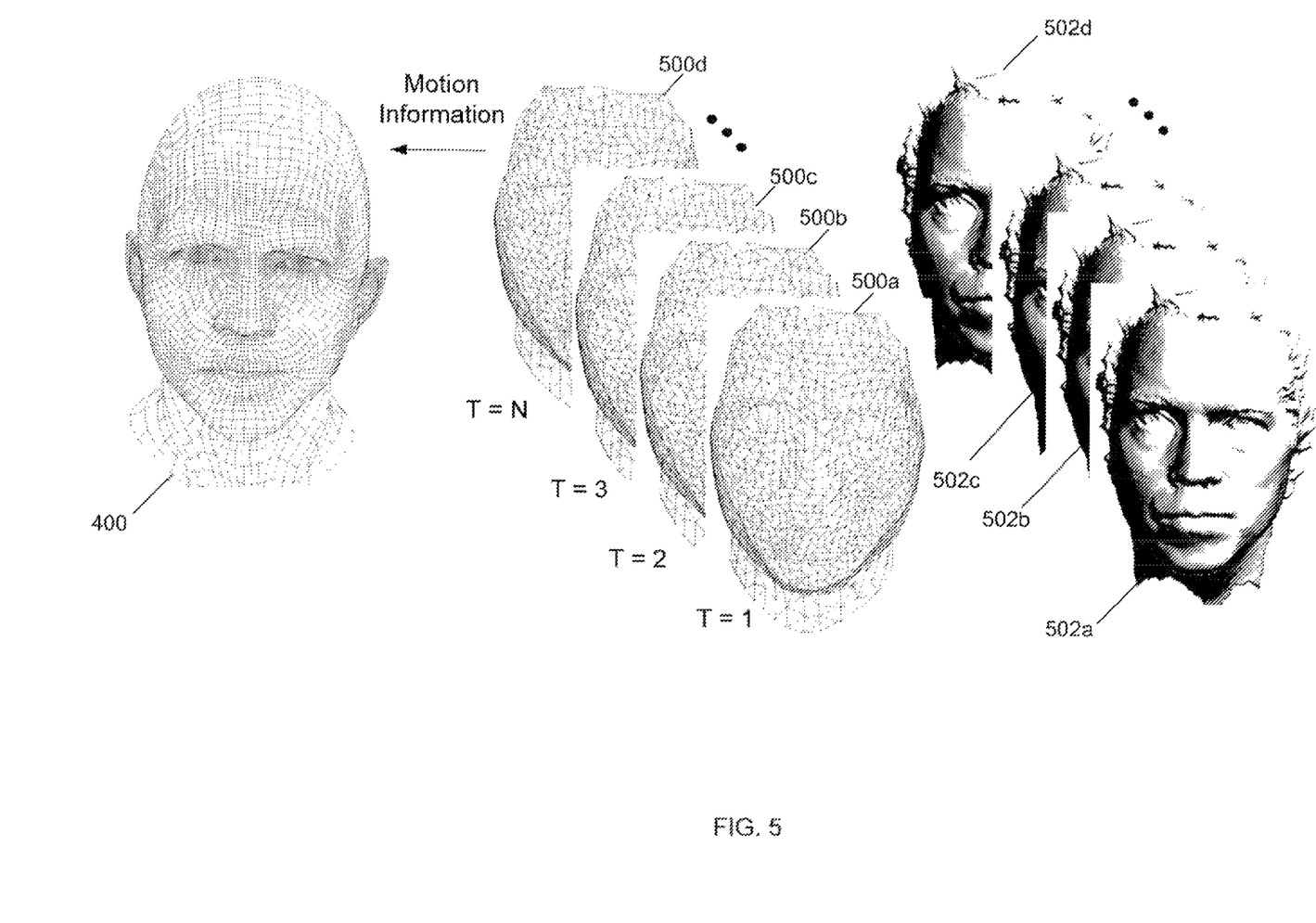
FIG. 5 is a diagram that illustrates transferring the motion information of motion meshes to an animation mesh using shape meshes.

Returning to FIG. 2, the motion transferor 122 includes a motion linker 208 that transfers the motion information of the motion meshes 204 to the animation mesh 205. Additionally, the motion linker 210 may use shape information from the shape meshes 202 to transfer the motion information to the animation mesh 206. In this example, the motion is transferred to a single animation mesh, however, in some implementations the motion may be transferred to multiple animation meshes. As illustrated in FIG. 5, the motion information associated with a sequence of motion meshes 500a-d is transferred to the animation mesh 400. Additionally, a corresponding sequence of shape, meshes 502a-d provide shape information that may be used in the motion transfer. To transfer the motion, the position of each vertex may be mapped from the motion meshes 500a-d to the animation mesh 400. For example, the position of each vertex included in motion mesh 500a (and associated with time T=1) may be transferred to appropriate vertices included in the animation mesh 400. Sequentially, the vertex, positions may then be transferred from motion meshes 500b, 500c and 500d (for times T=2, 3 and N) to animate the animation mesh 400.

Besides transferring data that represents the position of the vertices of the motion meshes 500a-d, other types of motion information may be transferred. For example, data that represents the change in the vertices positions over time may be provided to the animation mesh 400. As vertex positions sequentially change from one motion mesh (e.g., motion mesh 500a) to the next motion mesh (e.g., motion mesh 500b), the difference in position may be provided to animate the animation mesh 400. Encoding and compression techniques may also be implemented to efficiently transfer the motion information. Furthermore, rather than providing the motion information directly from each of the motion meshes 500*a-d*, a file containing data, which represents the motion information (e.g., vertex positions, change in vertex positions, etc.), may be used by the motion linker 208 to transfer the motion information to the animation mesh 400.

Position, changes of vertices of the motion meshes 500*a-d* may be directly mapped to equivalent vertices of the animation mesh 400. For example, if a vertex included in the animation mesh 400 has a location equivalent to a vertex in the motion meshes 500*a-d*, the motion associated with the motion mesh vertex may be directly transferred to the animation mesh vertex. However, in some scenarios, one or more of the motion mesh vertices may not have equivalent vertices in the animation mesh 400. The motion of the motion mesh vertices may still influence the motion of the animation mesh vertices in such situations. For example, motion mesh vertices may influence the motion of proximately located animation meshes vertices.

Additionally, the shape meshes 500*a-d* may influence the motion information being transferred to the animation mesh 400. For example, shape information (contained in the shape mesh 502*a*) may constrain the movement range of one or more vertices of the animation mesh 400. As such, while a motion mesh (e.g., motion mesh 500*a*) may transfer a vertex position (or position change) to a vertex of the animation mesh 400, a corresponding portion of a shape (of the shape mesh 502*a*) may limit the position or position change. Thereby, the transferred motion may not be allowed to significantly deviate from the shape provided by the shape mesh 502*a*. Shape changes (e.g., across the sequence of shape meshes 502*b-d*) may similarly constrain the motion information transferred from corresponding motion meshes (e.g., motion meshes 500*b-d*).

Figure 6A:
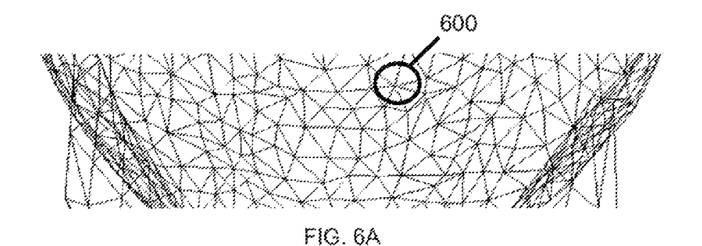
FIGS. 6A-C include a portion of the motion mesh, a portion of an animation mesh and a portion of a shape mesh.

Referring to FIG. 6A, a portion of the motion mesh 500*a* that represents the actor's mouth is illustrated. A vertex, highlighted by a ring 600, is located near the three-dimensional space in which the upper lip of the actor's mouth is represented. The vertex is also included in each of the motion meshes 500*b,c,d* that sequentially follow the motion mesh 500*a*. In one or more of the motion meshes, the position of the vertex may change to represent motion of the actor's upper lip. For example, the vertex may translate along one or more of the coordinate system 108 axes (e.g., X-axis, Y-axis, Z-axis).

Figure 6B:
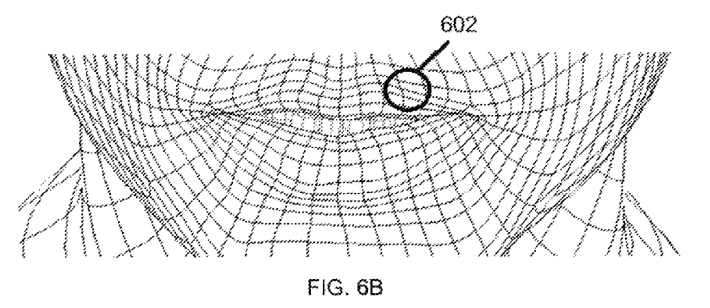

Referring to FIG. 6B, a portion of the animation mesh 400 that correspondingly represents the actor's mouth is illustrated. The equivalent location of the vertex (highlighted by the ring 600 in FIG. 6A) is highlighted by a ring 602 in the mesh. As the figure illustrates, the animation mesh includes multiple vertices within the ring 602 (compared to the single vertex included in the ring 600). Furthermore, none of the multiple vertices appear to be located in a position that is equivalent to the position of the vertex in the ring 600. As such, the motion of the motion mesh vertex (highlighted by the ring 600) may not directly map to the vertices (highlighted by the ring 602) in the animation mesh. However, the motion of the single vertex within the ring 600 may influence the motion of the multiple vertices within the ring 602. One or more techniques may be implemented to quantify the influence of the motion mesh vertex and determine the corresponding motion of the animation mesh vertices. For example, one or more adjacent vertices and the vertex (in the ring 600) may be interpolated (e.g., using linear interpolation, non-linear interpolation, etc.) to identify additional points. These interpolated points may be compared to the vertices included in the ring 602 for potentially selecting a point that may map to an appropriate animation mesh vertex. As such, the shape of the animation mesh may constrain which vertices or interpolated points of the motion mesh may be used to provide motion information. In the situation in which the location of an interpolated point matches the location of an animation mesh vertex, motion of the point (across a sequence of motion meshes) may be transferred to the animation mesh vertex. In scenarios absent a direct location match between a motion mesh vertex (or interpolated point) and an animation mesh vertex, one or more data fitting techniques (e.g., linear fitting, curve fitting, least squares approximation, averaging, etc.) may be applied in addition (or not) to other mathematic techniques (e.g., applying weighting factors, combining data values, etc.) to transfer motion.

Along with local motion mesh vertices (e.g., adjacent vertices) influencing the motion transferred to one or more animation mesh vertices, in some arrangements the influence of one or more remotely located motion mesh vertices may be used. For example, along with using vertices adjacent to the vertex within the ring 600, one or more vertices located more distance from this vertex may be used for interpolating additional motion mesh points. As such, the remotely located vertices may provide influences that produce correlated facial expressions that extend across broad portions of the actor's face. Alternatively, vertex influence may be reduced or removed. For example, the movement of some vertices may not significantly influence the movement of other vertices, even vertices proximate in location. Referring again to the actor's mouth, the upper lip and the lower lip may be considered proximately located. However, the movement of the upper lip may be independent of the movement of the lower lip. For example, if the upper lip moves upward, the lower lip may remain still of even move downward (as the actor's mouth is opened). Thus, in some situations, the movement of the lower lip is not influenced by the movement of the upper lip or vice versa. To dampen or isolate such an influence, the lower lip vertex positions of the animation mesh may be determined from the lower lip vertex positions of the motion mesh and independent of the upper lip vertex positions of the motion mesh. Similarly, upper lip vertex positions of the animation mesh may be determined independent of the lower lip positions of the motion mesh. Such vertex independence may be initiated by the motion transferor 122, by another process (e.g., the motion mesh generator 118) or by a user (e.g., a graphical artist) interacting with the motion meshes and animation mesh.

Figure 6C:
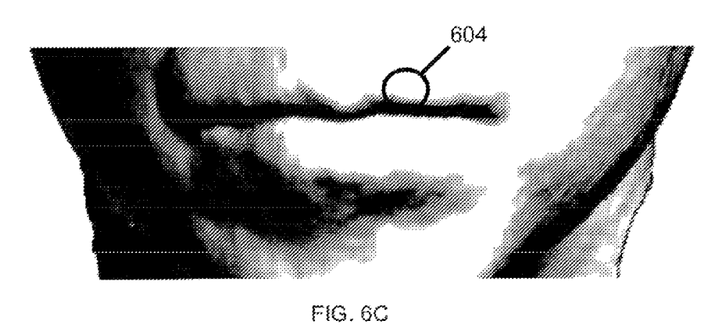

Referring to FIG. 6C, a portion of the shape mesh 502*a* that corresponds to the actor's mouth is illustrated. The equivalent location of the vertex (highlighted by the ring 600 in FIG. 6A) and the vertices (highlighted by the ring 602 in FIG. 6B) is highlighted by a ring 604 in the shape mesh portion. As the figure illustrates, one or more shapes are included within the ring 604. As mentioned above, the shape(s) may be used to influence the motion transfer. For example, the shapes included in the ring 604 may define a range that limits the motion transferred to the vertices in the ring 602. As such, motion transferred to the vertices within the ring 602 may be constrained from significantly deviating from shapes in the ring 604. Similar shapes in the sequence of shape meshes 502*b-d* may correspondingly constrain the transfer of motion information from respective motion meshes 500*b-d*.

In some situations, a shape mesh may include gaps that represent an absence of shape information. As such, the shape mesh may only be used to transfer motion information corresponding to locations in which shape information is present. For the locations absent shape information, motion information from one of more motion meshes may be transferred using shape information from the animation mesh. For example, the current shape or a previous shape of the animation mesh (for one or more locations of interest) may be used to provide shape information.

Other motion tracking techniques may also be used for motion transfer. For example, rather than tracking the motion of one or more distinct vertices, movement of facial features such as the curve of a lip or an eyebrow may be tracked for motion information. As such, shapes included in the actor's face may be tracked. For example, an expansive patch of facial area may tracked to provide the motion of the facial patch. Furthermore, along with tracking distinct artificial points (e.g., applied markers) and/or natural points (e.g., facial texture, facial features, etc.), distribution of points may be tracked for motion information. For example, motion information, from a collection of points (e.g., artificial points, natural points, a combination of natural and artificial points, etc.) may be processed (e.g., calculate average, calculate variance, etc.) to determine one or more numerical values to represent the motion of the distributed points. As such, the individual influence of one or more points included in the point collection can vary without significantly affecting the motion information of the distributed points as a whole. For example, a single natural or artificial point may optically fade in and out over a series of captured images. However, by including this single point in a distribution of points, a large motion variation (due to the fading in and out by this single point) may be reduced on average. In some implementations, this technique or similar techniques (e.g., optical flow) may be used in combination with tracking motion information from distinct points (e.g., artificial points, natural points).

Figure 4C:
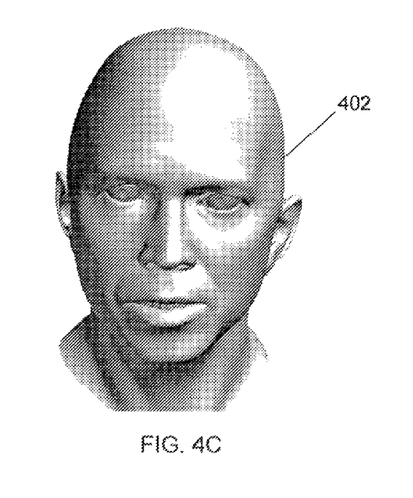

Referring back to FIG. 2, after the motion information, is transferred to the animation mesh 206, in this implementation, the animation mesh 206 is provided to a renderer 210 that renders an animated image and, for example, provides the rendered animated image to a display device (e.g., a computer monitor, etc.). In one implementation the renderer 210 is executed by the computer system 112. Referring to FIG. 4C, an exemplary rendered image 402 produced by the renderer 210 from the animation mesh 206 is presented.

The motion transferor 122 also includes a decomposer 212 that decomposes the motion information for storage in the motion library 124. Various types of decomposition techniques (e.g., Karhunen-Loeve (KL), etc.) may be implemented that use one or more mathematical analysis techniques (e.g., Fourier analysis, wavelet analysis, etc.). For example, a Principle Component Analysis (PCA) may be executed by the decomposer 212 to decompose a portion or all of the motion information into principle components. Along with decomposition, by computing the principle components, noise artifacts may be removed from the movement information. For example, noise introduced by the motion information may be substantially removed. For example, visually detectable jitter may be introduced into the individual facets of the animation mesh by the motion information. By computing the principle components, normal vectors associated with each of the mesh facets may be re-aligned and thereby reduce the visual jitter.

Once calculated, the principle components (or other type of decomposition data) may be stored in the motion library 124 (on storage device 114) for retrieval at a later time. For example, the principle components may be retrieved to generate an animation mesh that represents one or more of the facial expressions originally captured by the cameras 102a-e. The principle components may also be combined with other principle components (e.g., stored in the motion, library 124) by the motion transferor 122 (or other process) to produce animation meshes for other facial expressions that may be rendered by the renderer 210 for application on an animated character or other type of object.

Figure 7:
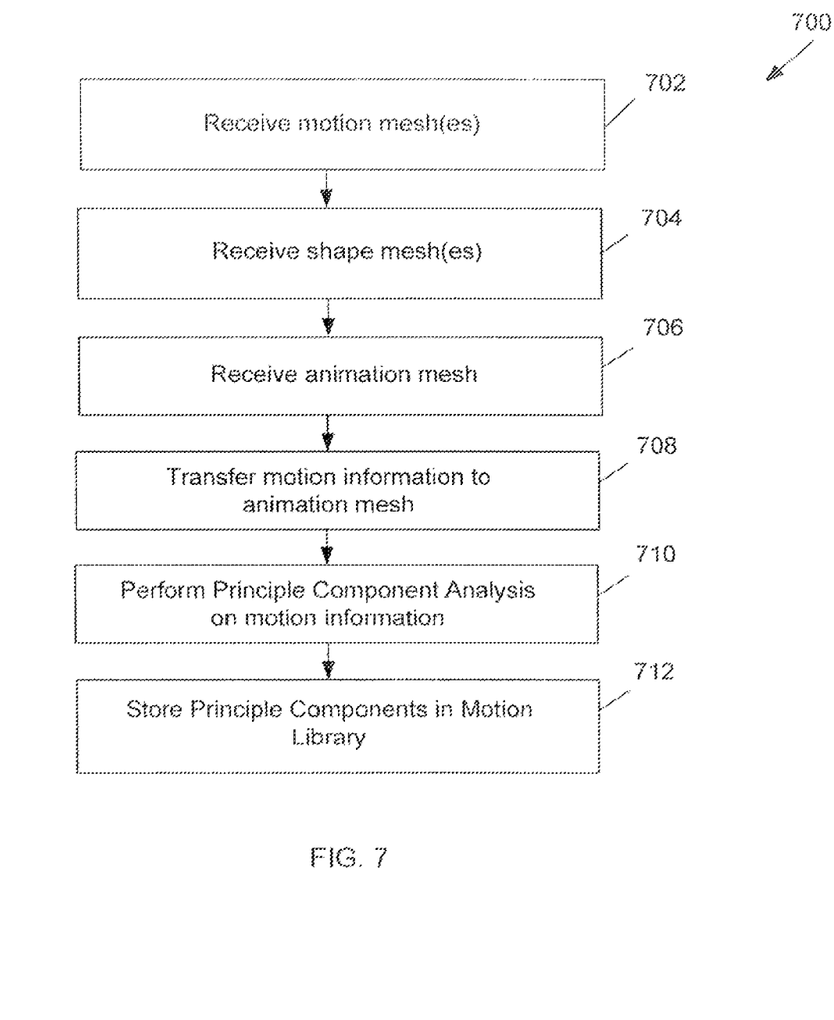
FIG. 7 is a flow chart of operations executed by a motion transferor.

Referring to FIG. 7, a flowchart 700 that represents some of the operations of the motion transferor 122 is shown. As mentioned above, the motion transferor 122 may be executed by a computer system (e.g., computer system 112) or multiple computing devices. Along with being executed at a single site (e.g., at one computer system), operation execution may be distributed among two or more sites.

Operations of the motion transferor 122 include receiving 702 one or more motion meshes (e.g., from the motion mesh generator 118). Operations also include receiving 704 one or more shape meshes and receiving 706 at least one animation mesh. Typically, the motion mesh (or meshes) have a lower resolution than the animation mesh since the vertices of the motion mesh are defined by the visual representation of artificial points (e.g., markers) applied to a deformable object (e.g., an actor's face) included in the captured images. As mentioned, natural points (e.g., facial texture, facial features, etc.) may be used to define the vertices or other types of tracking points or features. Operations also include transferring 708 the motion information (provided by the motion meshes) to the animation mesh. As mentioned above, the shape meshes may influence (e.g., constrain) the transfer for the motion information. Thereby, motion representing e.g., facial expressions, are applied to a high-resolution animation mesh. Other operations may also be performed on the motion information. For example, the motion transferor 122 may perform 710 Principle Component Analysis or other type of decomposition on the motion information to generate principle components. Once computed, the principle components may be stored 712 for retrieval at a later time for individual use or in combination with other principle components or other types of data (e.g., weighting factors, etc.). For example, the stored principle components may be used with an animation mesh to generate one or more facial expressions captured from the actor's face. The stored principle components may also be used to generate non-captured facial expressions by being further processed (e.g., weighted, combined, etc.) with or without other principle components.

To perform the operations described in flow chart 700, computer system 112 (shown in FIG. 1) may perform any of the computer-implement methods described previously, according to one implementation. The computer system 112 may include a processor (not shown), a memory (not shown), a storage device (e.g., storage device 114), and an input/output device (not shown). Each of the components may be interconnected using a system bus or other similar structure. The processor is capable of processing instructions for execution within the computer system. In one implementation, the processor is a single-threaded processor. In another implementation, the processor is a multi-threaded processor. The processor is capable of processing instructions stored in the memory or on the storage device to display graphical information for a user interface on the input/output device.

The memory stores information, within the computer system. In one implementation, the memory is a computer-readable medium. In one implementation, the memory is a volatile memory unit. In another implementation, the memory is a non-volatile memory unit.

The storage device is capable of providing mass storage for the computer system. In one implementation, the storage device is a computer-readable medium. In various different implementations, the storage device may be a floppy disk device, a hard disk device, an optical disk device, or a tape device.

The input/output device provides input/output operations for the computer system. In one implementation, the input/output device includes a keyboard and/or pointing device. In another implementation, the input/output device includes a display unit for displaying graphical user interfaces.

The features described can be implemented in digital electronic circuitry, or in computer hardware, firmware, software, or in combinations of them. The apparatus can be implemented in a computer program product tangibly embodied, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data flies; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method, the method comprising:
transferring motion information in a processor from at least one motion mesh to an animation mesh, wherein the motion mesh represents the motion of surface features of an object represented by the animation mesh, a shape mesh provides a portion of the shape of the object to the animation mesh and influences the motion information provided by the motion mesh.

2. The computer-implemented method of claim 1, wherein the motion mesh is generated from a series of images of the object captured by at least one device.

3. The computer-implemented method of claim 1, wherein the motion information includes the position of a vertex included in the motion mesh.

4. The computer-implemented method of claim 1, wherein the motion information includes the position of a surface structure included in the motion mesh.

5. The computer-implemented method of claim 4, wherein the surface structure includes a curved surface structure.

6. The computer-implemented method of claim 4, wherein the surface structure includes a surface structure patch.

7. The computer-implemented method of claim 1, wherein the motion information is transferred to a vertex included in the animation mesh.

8. The computer-implemented method of claim 1, wherein the motion information is transferred to a surface structure included in the animation mesh.

9. The computer-implemented method of claim 8, wherein the surface structure includes a curved surface structure.

10. The computer-implemented method of claim 8, wherein the surface structure includes a surface structure patch.

11. The computer-implemented method of claim 1, wherein the position of a vertex of the animation mesh represents a position of at least one vertex of the motion mesh.

12. The computer-implemented method of claim 1, wherein the position of a vertex of the animation mesh is influenced by at least one vertex of the motion mesh.

13. The computer-implemented method of claim 1, wherein the position of a vertex of the animation mesh is influenced by at least one vertex of the motion mesh and the shape of the shape mesh.

14. The computer-implemented method of claim 1, wherein the position of a vertex of the animation mesh is independent of the influence of at least one vertex of the motion mesh.

15. The computer-implemented method of claim 1, wherein the position of a vertex of the animation mesh represents an interpolated position of at least two vertices of the motion mesh.

16. The computer-implemented method of claim 1, wherein the position of a vertex of the animation mesh changes based upon the position of a vertex of another motion mesh.

17. The computer-implemented method of claim 1, further comprising:
  decomposing the motion information.
18. The computer-implemented method of claim 1, further comprising:
  decomposing the motion information into principle components.
19. The computer-implemented method of claim 1, further comprising:
  decomposing a portion of the motion information into principle components.
20. The computer-implemented method of claim 19, further comprising:
  storing the decomposed motion information.
21. The computer-implemented method of claim 1, wherein the resolution of animation mesh is higher than the resolution of the motion mesh.
22. The computer-implemented method of claim 1, wherein the motion information is stored in a data file.
23. The computer-implemented method of claim 1, wherein the animation mesh includes vertices that are substantially uniformly distributed.
24. The computer-implemented method of claim 1, wherein the animation mesh includes vertices that are substantially distributed across a portion of the mesh.
25. The computer-implemented method of claim 1, wherein the animation mesh includes vertices and surface structures.
26. The computer-implemented method of claim 1, wherein the surface features include artificial points.
27. The computer-implemented method of claim 1, wherein the surface features include natural points.
28. The computer-implemented method of claim 1, wherein the surface features include curves.
29. The computer-implemented method of claim 1, wherein transferring the motion information includes interpolating vertices included in the motion mesh.
30. The computer-implemented method of claim 1, wherein transferring the motion information includes interpolating vertices included in the motion mesh in a non-linear manner.
31. The computer-implemented method of claim 1, wherein the object is a deformable object.
32. The computer-implemented method of claim 1, wherein the object is an actor's face.
33. A system comprising:
  a computer system comprising:
    a processor; and
    a motion transferor to transfer motion information from at least one motion mesh to an animation mesh, wherein the motion mesh represents the motion of surface features of an object represented by the animation mesh, a shape mesh provides a portion of the shape of the object to the animation mesh and influences the motion information provided by the motion mesh.
34. The system of claim 33, wherein the motion mesh is generated from a series of images of the object captured by at least one device.
35. The system of claim 33, wherein the motion information includes the position of a vertex included in the motion mesh.
36. The system of claim 33, wherein the motion information includes the position of a surface structure included in the motion mesh.
37. The system of claim 36, wherein the surface structure includes a curved surface structure.
38. The system of claim 36, wherein the surface structure includes a surface structure patch.
39. The system of claim 33, wherein the motion information is transferred to a vertex included in the animation mesh.
40. The system of claim 33, wherein the motion information is transferred to a surface structure included in the animation mesh.
41. The system of claim 40, wherein the surface structure includes a curved surface structure.
42. The system of claim 40, wherein the surface structure includes a surface structure patch.
43. The system of claim 33, wherein motion transferring includes the position of a vertex of the animation mesh being influenced by at least a vertex of the motion mesh and the shape of the shape mesh.
44. The system of claim 33, wherein the motion transferor is capable of decomposing the motion information.
45. The system of claim 44, wherein the motion transferor is capable of storing the decomposed motion information.
46. A computer program product tangibly embodied in a machine-readable storage device and comprising instructions that when executed by a processor perform a method comprising:
  transferring motion information from at least one motion mesh to an animation mesh, wherein the motion mesh represents the motion of surface features of an object represented by the animation mesh, a shape mesh provides a portion of the shape of the object to the animation mesh and influences the motion information provided by the motion mesh.
47. The computer product of claim 46, wherein the motion mesh is generated from a series of images of the object captured by at least one device.
48. The computer product of claim 46, wherein the motion information includes the position of a vertex included in the motion mesh.
49. The computer product of claim 46, wherein the motion information includes the position of a surface structure included in the motion mesh.
50. The computer product of claim 49, wherein the surface structure includes a curved surface structure.
51. The computer product of claim 49, wherein the surface structure includes a surface structure patch.
52. The computer product of claim 46, wherein the motion information is transferred to a vertex included in the animation mesh.
53. The computer product of claim 46, wherein the motion information is transferred to a surface structure included in the animation mesh.
54. The computer product of claim 53, wherein the surface structure includes a curved surface structure.
55. The computer product of claim 53, wherein the surface structure includes a surface structure patch.
56. The computer product of claim 46, wherein the position of a vertex of the animation mesh is influenced by at least a vertex of the motion mesh and the shape of the shape mesh.
57. The computer product of claim 46, further comprising instructions that when executed cause the processor to decompose the motion information.
58. The computer product of claim 57, further comprising instructions that when executed cause the processor to store the decomposed motion information.
59. A motion capture system comprising:
  at least one device to capture a series of images of an object; and
  a computer system to execute at least one process to:

generate at least one motion mesh that represents the motion of surface features of the object; and transfer the motion information of the motion mesh to an animation mesh for animation of the object being represented by the animation mesh, wherein a shape mesh provides a portion of the shape of the object to the animation mesh and influences the motion information provided by the motion mesh.

60. The motion capture system of claim 59, wherein the motion information includes the position of a vertex included in the motion mesh.

61. The motion capture system of claim 59, wherein the motion information includes the position of a surface structure included in the motion mesh.

62. The motion capture system of claim 61, wherein the surface structure includes a curved surface structure.

63. The motion capture system of claim 61, wherein the surface structure includes a surface structure patch.

64. The motion capture system of claim 59, wherein the motion information is transferred to a vertex included in the animation mesh.

65. The motion capture system of claim 59, wherein the motion information is transferred to a surface structure included in the animation mesh.

66. The motion capture system of claim 65, wherein the surface structure includes a curved surface structure.

67. The motion capture system of claim 65, wherein the surface structure includes a surface structure patch.

68. The motion capture system of claim 59, wherein the position of a vertex of the animation mesh is influenced by at least a vertex of the motion mesh and the shape of the shape mesh.

69. The motion capture system of claim 59, wherein the computer system is further capable of decomposing the motion information.

70. The motion capture system of claim 69, wherein the computer system is further capable of storing the decomposed motion information.

* * * * *